No. 873,829.
PATENTED DEC. 17, 1907.
B. G. BAKER.
PNEUMATIC STACKER.
APPLICATION FILED OCT. 10, 1906.
4 SHEETS—SHEET 3.
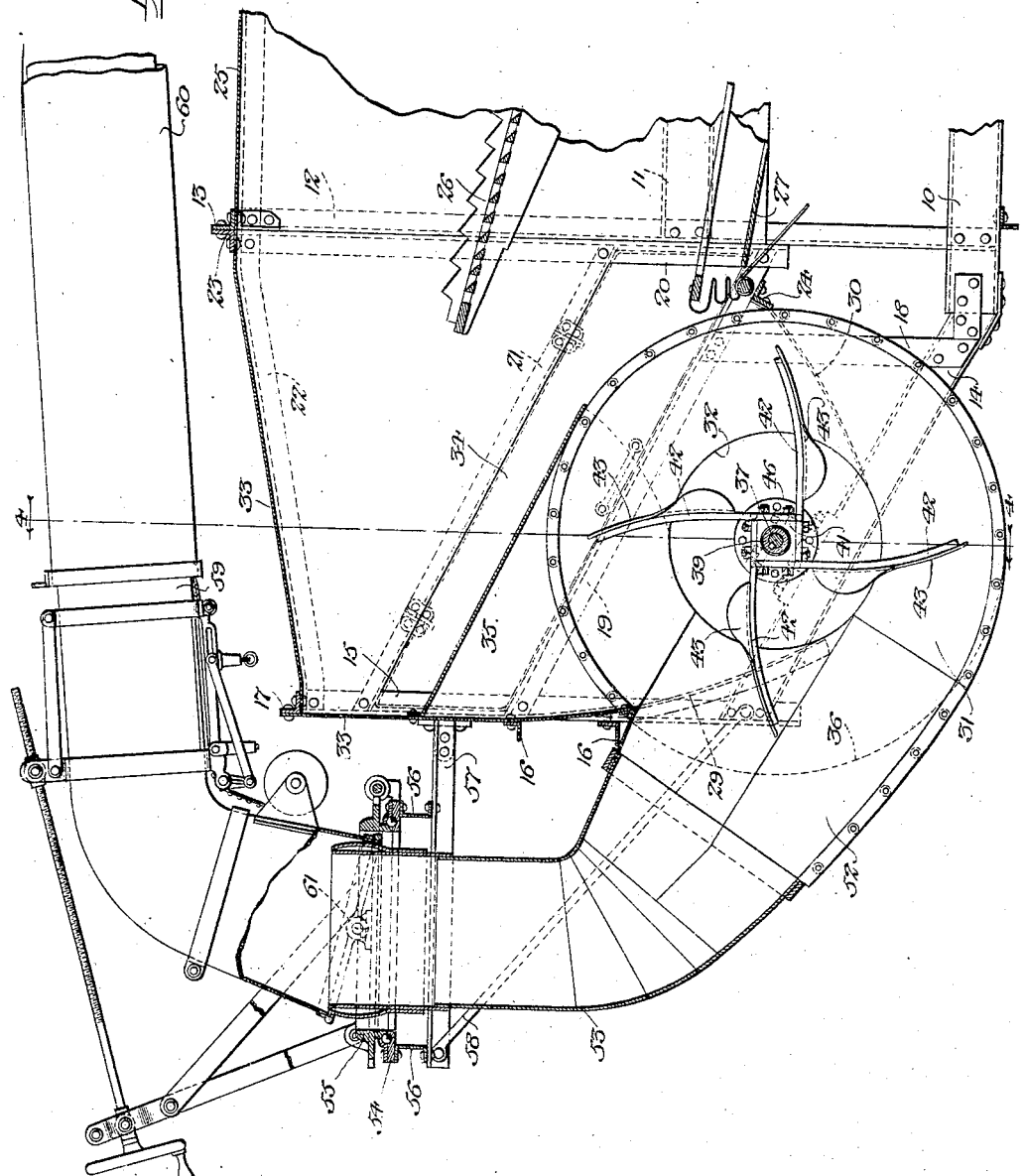

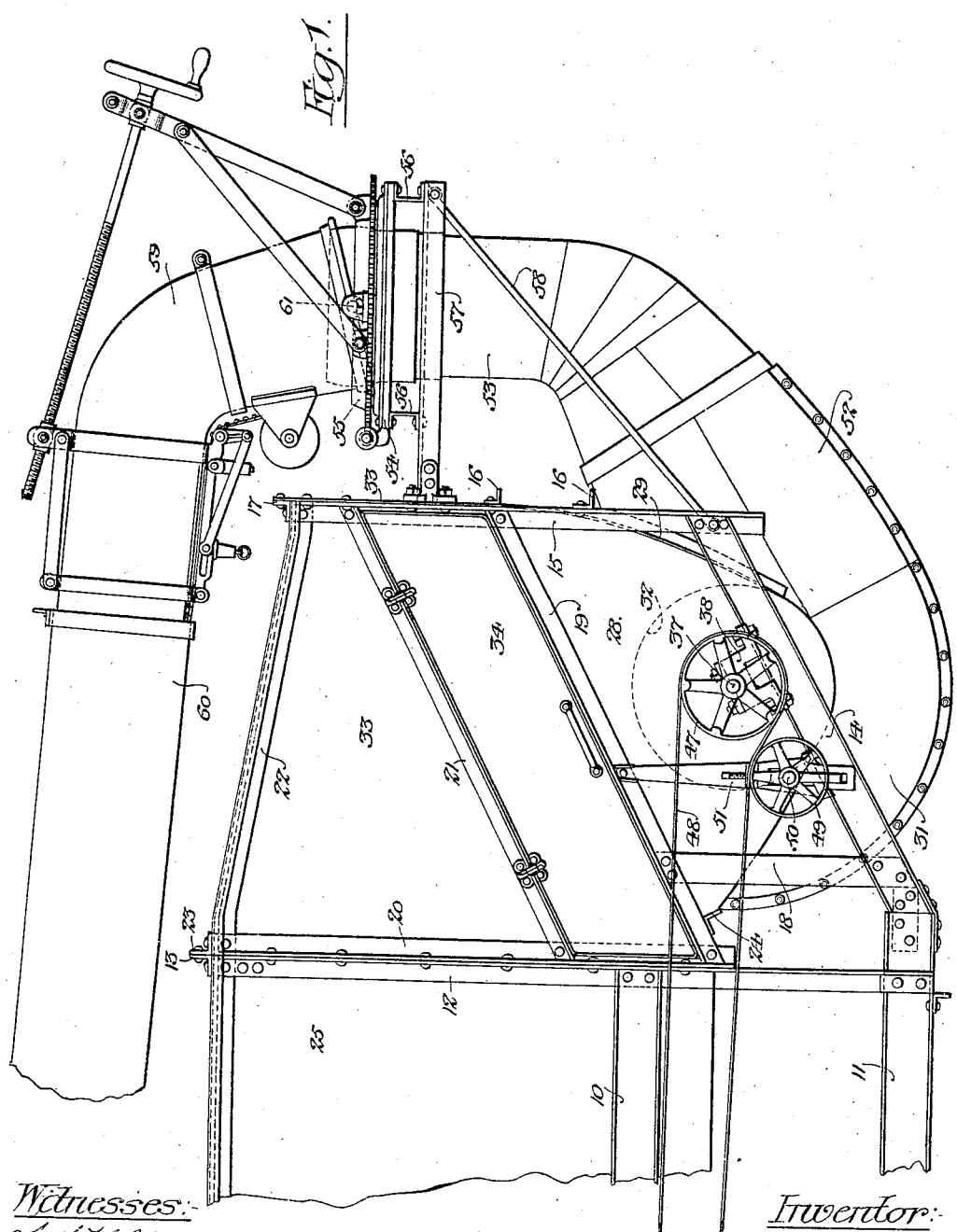

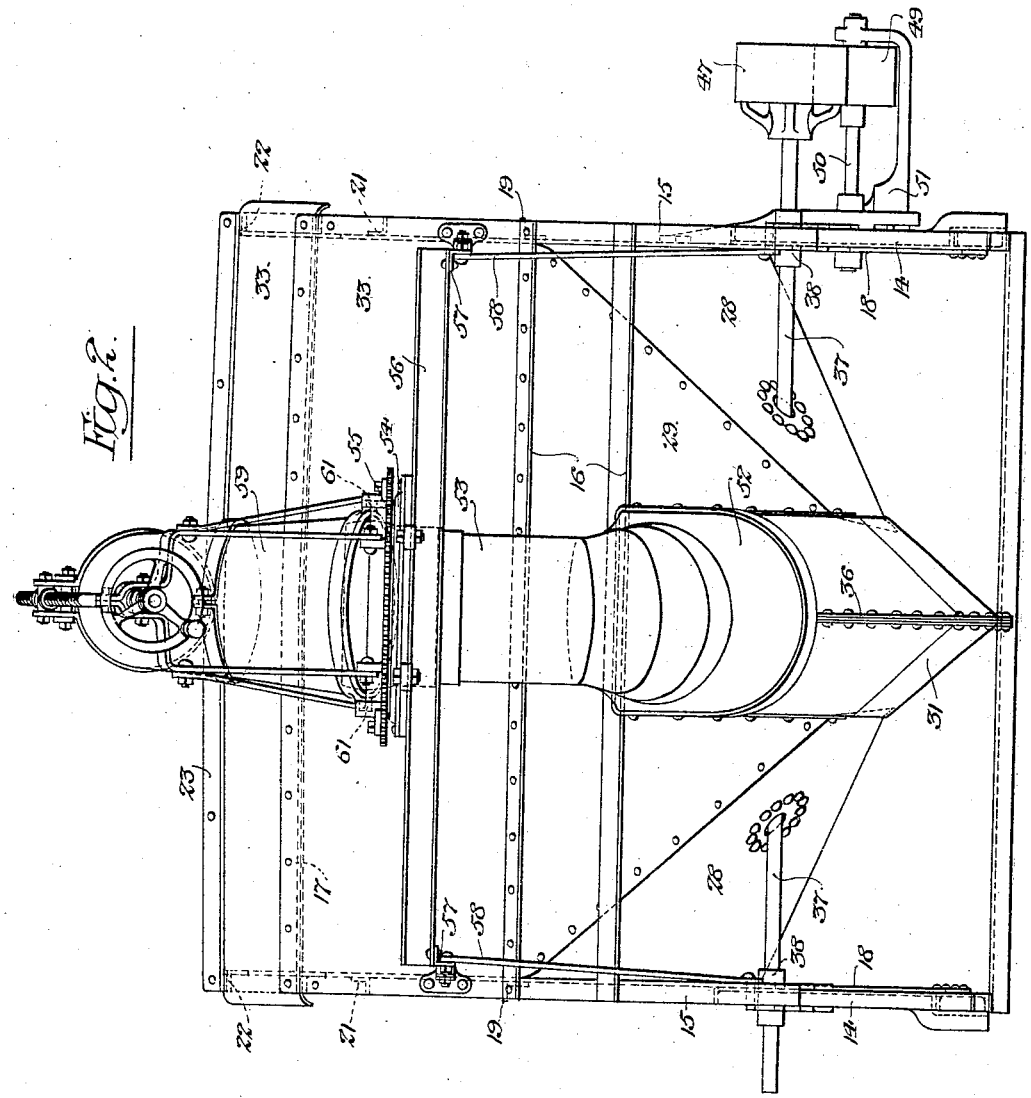

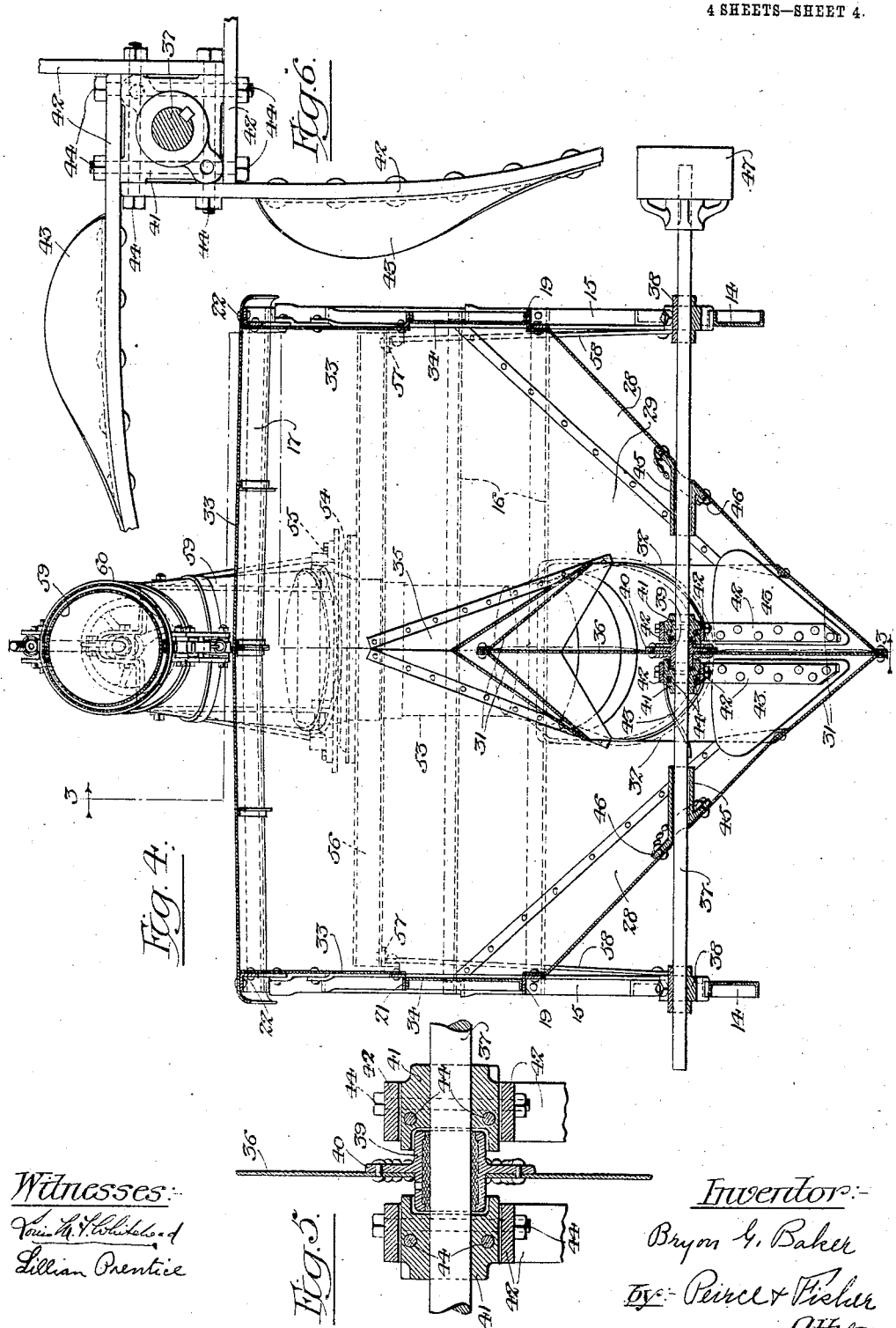

UNITED STATES PATENT OFFICE.

BRYON G. BAKER, OF MINNEAPOLIS, MINNESOTA, ASSIGNOR TO J. I. CASE THRESHING MACHINE COMPANY, OF RACINE, WISCONSIN, A CORPORATION.

PNEUMATIC STACKER.

No. 873,829.      Specification of Letters Patent.      Patented Dec. 17, 1907.

Application filed October 10, 1906. Serial No. 338,210.

To all whom it may concern:

Be it known that I, BRYON G. BAKER, a citizen of the United States, and a resident of Minneapolis, county of Hennepin, and State of Minnesota, have invented certain new and useful Improvements in Pneumatic Stackers, of which the following is declared to be a full, clear, and exact description.

The invention relates to pneumatic stackers such as are employed in connection with threshing machines, corn huskers and the like to remove the straw and chaff from the machine and deliver it onto the stack.

The improvement seeks to provide a simple and effective arrangement of the stacker fan in vertical position so that it can be mounted upon a transverse horizontal shaft and thus driven directly by a belt from one of the transverse shafts of the machine without the use of gears.

The invention consists in the features of construction, combinations and arrangements of parts hereinafter set forth, illustrated in the accompanying drawings and more particularly pointed out in the appended claims.

In the drawings Figure 1 is a side elevation of the improved stacker shown attached to the rear end of a threshing machine. Fig. 2 is a view in rear elevation of the stacker. Fig. 3 is a view in longitudinal section on the line 3—3 of Fig. 4. Fig. 4 is a cross section on the line 4—4 of Fig. 3. Fig. 5 is an enlarged detail section of the parts shown in Fig. 4. Fig. 6 is a detail view in elevation of a portion of one of the fans.

The frames of the threshing machine and stacker are shown in the drawings as formed of structural steel bars. Other material could of course be used.

In Figs. 1 and 3 the rear ends of the sills 10 and 11 of the threshing machine are shown connected by upright angle bar 12. At the upper ends the uprights 12 are connected by a transverse angle bar 13. The stacker frame includes the upwardly and rearwardly inclined sills 14 suitably secured at their lower forward ends to the rear ends of the sills 11 of the threshing machine frame. At the rear ends of the sills 14 a pair of uprights 15 are fixed which are connected between their ends by horizontal angle bars 16 and at their upper ends by a transverse angle bar 17. The forward part of the stacker frame is formed by the uprights 18 fixed at their lower ends to the sills 14 and at their upper ends to the inclined side bars 19. The latter in turn are connected at their rear ends to the uprights 15. Upright angle bars 20 are connected at their lower ends to the side bars 19 and are also connected to the rear upright bars 15 by side bars 21 and 22. The uprights 20 are connected together at their upper ends by a transverse angle bar 23. The angle bars 20 and 23 of the stacker frame are bolted to the angle bars 12 and 13 of the frame of the threshing machine. The lower side bars 19 of the stacker frame are connected together at their forward ends by the transverse angle bar 24.

The frame bars of the threshing machine are covered by a suitable sheathing 25 of sheet metal. In Fig. 3 the rear end of the straw rack 26 is shown and also the rear end of the separating sieve 27. These parts extend rearwardly into the stacker frame to deliver the straw and chaff thereto.

A hopper comprising side walls 28, rear wall 29 and front wall 30 is arranged within the lower portion of the stacker frame and the upper edges of its walls are secured respectively to the inclined side bars 19 and to the front and rear transverse bars 24 and 16. The walls of the hopper converge downwardly to the vertical fan casing 31 arranged centrally within the hopper. The fan casing 31 is preferably constructed as shown, of two sections of truncated conical form so that the walls of the casing are inclined inwardly from the central plane of the casing to the axis thereof, the side walls are provided with openings or eyes 32 on opposite sides thereof, and which openings lead from the interior of the hopper. The fan casing is thus V-shaped in section and as shown, the inclined side walls 28 of the hopper extend substantially in line with the lower portions of the inclined walls of the fan casing and are secured to the lower edges of the eyes or openings 32. With the arrangement described, the straw and chaff passing from the threshing machine will be properly delivered by the inclined walls of the hopper through the open sides of the fan casing and no surfaces are presented whereon the straw can lodge and thus clog the operation of the machine.

The stacker frame bars above the hopper are inclosed by suitable walls or sheathing 33 of sheet metal. The side sections 34 of these walls between the side bars 19 and 21 are preferably removable so as to afford access to the interior of the stacker frame. A deflector 35 formed of sheet metal and of inverted V-shape, is interposed between the upper portion of the fan casing 31 and the rear wall of the stacker frame to prevent straw lodging at this point between the fan casing and the rear wall. The upper edge of this deflector, as shown, is preferably inclined upwardly and rearwardly from the fan casing.

A vertically disposed circular partition 36 is arranged between the sections of the fan casing 31 and is riveted at its edge thereto so as to divide the casing into separate compartments in which fans are arranged on opposite sides of the partition. A horizontal transverse fan shaft 37 is journaled in bearings 38 mounted on the sills 14 and extends through the hopper and through the fan casing. A central bearing or journal box 38 for the fan shaft 37 is provided with a flange 40 that is riveted to the central partition 36 of the fan casing. The fans comprise the hubs 41, arms 42 and blades 43. The hubs are preferably square in outline, as shown, and are keyed to the shaft 37 on opposite sides of the bearing 39. The inner faces of the hubs are preferably recessed (see Fig. 5) so that they may extend over the ends of the bearing 39 to position the fan blades closely adjacent the opposite faces of the partition 36. The arms 42 of the fans are secured to the faces of the hubs 41 by the bolts 44 which extend through the hubs on opposite sides of the shaft 37. The blades 43 are riveted to the arms 44 and are triangular in outline so as to conform with the conical shape of the fan casing. The outer ends of the fan blades are bent or turned forwardly (see Fig. 3) in the direction in which the fans rotate.

Sleeves 45 surround the fan shaft 37 and are secured to the side walls of the hopper and project inwardly therefrom. These sleeves are preferably provided with flanges 46 that are riveted to the side walls 28 of the hopper. These sleeves do not snugly fit the shaft but are sufficiently close to the shaft to prevent any interference with the proper suction of the fan from the interior of the threshing machine. The fan shaft is provided on one end with a pulley 47 which is connected directly by a belt 48 (see Fig. 1) to one of the drive shafts of the threshing machine. The belt tightening idler pulley 49 is preferably arranged adjacent the pulley 47 and is mounted, as shown, on a short shaft 50 carried in a bracket 51 that is secured to the sill 14 and side bar 19 of the stacker frame.

The lower rear portion of the periphery of the fan casing is provided with a nozzle 52 leading to the upturned stacker trunk 53. The upper end of the trunk 53 is arranged within the circular frame 54 of the turn table 55. Frame 54 is carried upon the cross bars 56 which in turn are mounted upon the bars 57 that are secured to the stacker frame and project rearwardly therefrom, and the outer ends of which are supported by the brace rods 58.

Any suitable form of swinging discharge chute may be employed. That shown comprises the telescoping sections 59 and 60. The down turned end of the inner section 59 extends over the upper end of the stacker trunk 53 and is connected with turn table 55 by pintles 61. Suitable means are provided for raising and lowering the chute and for swinging it from side to side. Such devices are well known in the art and need not be more fully described here.

With the vertical arrangement of the fan casing, the fan shaft may be driven directly by a belt and the necessity of employing gears is avoided so that the stacker may be operated with less power. With stackers heretofore used having a vertical fan casing with its opening or eye at the side, it has been difficult to properly draw in the straw and chaff from the threshing machine into the fan casing through such a side opening and such a construction was apt to clog up with straw. The difficulty was avoided in the stackers employing fan casings with an upwardly facing eye or opening, but such construction necessitated the use of gears for rotating the fan. The present improvement as stated, obviates the necessity of employing gears and the peculiar form and arrangement of the fan casing and hopper insures the proper delivery of the straw and chaff into the fan and out through the stacker trunk and discharge chute.

It is obvious that numerous changes may be made in the details of structure and arrangement of parts without departure from the essentials of the invention.

Having described my invention, what I claim as new and desire to secure by Letters Patent is:—

1. In a pneumatic stacker, the combination with the stacker trunk, of a vertical fan casing opening at its periphery into said trunk, said casing having walls that are inwardly inclined from its central plane to openings on opposite sides thereof, a hopper inclosing said casing and having inclined walls leading to the opposite side openings of said casing, a fan in said casing and a transverse horizontal shaft extending through said hopper and said fan casing whereon said fan is mounted, substantially as described.

2. In a pneumatic stacker, the combination with the stacker trunk, of a vertical fan casing opening at its periphery into said trunk, said casing being V-shaped in section and having walls inclined inwardly to openings on opposite sides thereof, a hopper inclosing said casing and having downwardly converging walls leading to the openings on the opposite sides of said fan casing, a fan in said casing having triangular shaped blades and a horizontal transverse shaft extending through said hopper and said casing whereon said fan is mounted, substantially as described.

3. In a pneumatic stacker, the combination with the stacker trunk, of a vertical fan casing opening at its periphery into said trunk, said casing having walls inclined inwardly from its central plane to openings on opposite sides thereof, a hopper inclosing said casing and leading to the opposite side openings, a central partition dividing said fan casing, fan blades on opposite sides of said partition and a transverse horizontal shaft extending through the hopper and said fan casing whereon said fan blades are mounted, substantially as described.

4. In pneumatic stackers, the combination with the stacker trunk, of a vertical fan casing communicating at its periphery with the stacker trunk and having inlet openings at its opposite sides, a hopper inclosing said casing and having downwardly converging side walls leading to the side openings of said fan casing, a fan in said casing, a transverse horizontal shaft extending through said hopper and said casing whereon said fan is mounted and tubular sleeves fixed to the side walls of said hopper, extending inwardly therefrom and entirely surrounding said shaft, substantially as described.

5. In a pneumatic stacker, the combination with the stacker frame comprising sills and frame bars mounted thereon, of a stacker trunk and hopper on said frame, a fan casing in said hopper and having opposite side openings communicating with the interior thereof and a peripheral opening communicating with the stacker trunk, a fixed central partition dividing said fan casing, a transverse horizontal shaft extending through said hopper and fan casing, bearings for said shaft mounted on the sills of the stacker frame and on said partition and fans fixed to said shaft on opposite sides of said partition, substantially as described.

6. In pneumatic stackers, the combination with the stacker trunk, of a fan casing opening at its periphery into said trunk, said casing having walls inwardly inclined from its central plane to openings on opposite sides thereof, a hopper inclosing said casing and having downwardly converging walls leading to the openings thereof and extending substantially in line with the inclined walls at the lower portion of the fan casing, a partition dividing said fan casing, fan blades in said casing on opposite sides of said partition and a shaft whereon said blades are mounted, substantially as described.

7. In a pneumatic stacker, the combination with the stacker trunk and hopper, of a fan casing communicating at its periphery with said trunk and having openings at its opposite sides leading from the interior of said hopper, a fixed central partition dividing said fan casing, fans in said casing on opposite sides of said partition and a shaft extending through said casing whereon said fans are mounted, substantially as described.

8. In a pneumatic stacker, the combination with the stacker trunk and hopper, of a vertical fan casing communicating at its periphery with said stacker trunk and having opposite side openings leading from the interior of said hopper, a fixed central vertical partition dividing said fan casing, a transverse horizontal shaft extending through said hopper and fan casing, a bearing for said shaft fixed to said partition, hubs fixed to said shaft on opposite sides of said bearing and fan blades carried by said hubs, substantially as described.

9. In a pneumatic stacker, the combination with the stacker trunk, of a fan casing opening at its periphery into said trunk, said casing having inclined side walls converging to openings on opposite sides thereof, a hopper inclosing said fan casing and having inclined walls leading to the openings thereof, a central fixed partition dividing said casing, fans in said casing on opposite sides of said partition and a transverse shaft extending through said hopper and said casing whereon said fans are mounted, substantially as described.

10. In a pneumatic stacker, the combination with the stacker trunk, of a vertical fan casing opening at its periphery into said stacker trunk, said casing having inclined walls converging to opposite side openings thereof, a hopper inclosing said casing and having inclined walls leading to said side openings, a fixed vertical partition dividing said fan casing, fans on opposite sides of said partition having triangular shaped blades and a transverse horizontal shaft extending through said hopper and fan casing whereon said fans are mounted, substantially as described.

11. In a pneumatic stacker, the combination with the stacker frame comprising the sills and frame bars of a stacker trunk and hopper carried by said frame, a vertical fan casing in said hopper and having opposite side openings leading from the interior thereof, said fan casing opening in its periphery to the stacker trunk and having a fixed, central partition dividing it into separate compartments, a horizontal transverse shaft journaled in bearings on the sills of the stacker frame and extending through said hopper and fan casing, a central bearing for said shaft fixed to said partition and fans arranged in the fan casing on opposite sides of said partition and mounted on said shaft, substantially as described.

BRYON G. BAKER.

Witnesses:
WILLIAM T. KING,
HARRY C. ATWOOD.